United States Patent
Lindley

(10) Patent No.: US 7,599,819 B2
(45) Date of Patent: Oct. 6, 2009

(54) METHOD AND SYSTEM FOR GENERATING A PREDICTIVE ANALYSIS OF THE PERFORMANCE OF PEER REVIEWS

(75) Inventor: Joe H. Lindley, Garland, TX (US)

(73) Assignee: Raytheon Company, Waltham, MA (US)

(*) Notice: Subject to any disclaimer, the term of this patent is extended or adjusted under 35 U.S.C. 154(b) by 80 days.

(21) Appl. No.: 11/624,438

(22) Filed: Jan. 18, 2007

(65) Prior Publication Data

US 2008/0178145 A1    Jul. 24, 2008

(51) Int. Cl.
*G06F 15/00* (2006.01)
*G06F 17/18* (2006.01)

(52) U.S. Cl. .............. 702/189; 702/181; 702/182; 702/188

(58) Field of Classification Search ............... 702/189, 702/181, 182, 119, 123, 183–186, 188, 120–122; 705/7, 9; 717/101
See application file for complete search history.

(56) References Cited

U.S. PATENT DOCUMENTS

| | | | |
|---|---|---|---|
| 2003/0070157 A1* | 4/2003 | Adams et al. ............. | 717/101 |
| 2004/0255265 A1* | 12/2004 | Brown et al. ............. | 717/101 |
| 2005/0033629 A1* | 2/2005 | Forman et al. ............ | 705/10 |
| 2007/0027652 A1* | 2/2007 | Hosagrahara ............. | 702/182 |

* cited by examiner

*Primary Examiner*—Eliseo Ramos Feliciano
*Assistant Examiner*—Phuong Huynh
(74) *Attorney, Agent, or Firm*—Baker Botts L.L.P.

(57) ABSTRACT

According to one embodiment of the disclosure, a method for use in software development includes receiving, for a software project, parameters indicative of one or more peer reviews for the software project. The method also includes generating a predictive analysis of the performance of the one or more peer reviews based on the parameters.

15 Claims, 2 Drawing Sheets

METHOD AND SYSTEM FOR GENERATING A PREDICTIVE ANALYSIS OF THE PERFORMANCE OF PEER REVIEWS

TECHNICAL FIELD

This disclosure relates generally to software peer reviews, and more particularly, to a method and system for generating a predictive analysis of the performance of peer reviews.

OVERVIEW

Conventional software peer reviews refer to reviews of any work product to identify defects using a defined process. Peer reviews may include, but are not limited to formal inspections (typically called inspections), critiques, and walkthroughs. For example, in a peer review, a work product may be selected for review and a team is gathered for a peer review meeting to review the work product. Commonly inspected work products include software requirement specifications, test plans, and source code. The goal of the peer review is to identify and remove defects in the work product.

Peer reviews are considered an industry best practice for detecting defects at an early stage. When performed properly, peer reviews both significantly reduce development cost and improve product quality. However, the level of effort devoted to peer reviews (e.g. the number of peer reviews performed for a given code size) and the performance standards for peer reviews are often determined, not by a quantitative assessment of their impact on cost and quality, but rather according to the subjective standards of either the inspectors or the members of the software development team. To further complicate the situation, software development teams vary significantly in the quality of the artifacts they produce. A level of effort and performance standard for peer reviews may be sufficient for some teams but not for others. Many software development teams are therefore not equipped to take advantage of one of the most powerful quality and cost savings practices available.

SUMMARY

According to one embodiment of the disclosure, a method for use in software development includes receiving, for a software project, parameters indicative of one or more peer reviews for the software project. The method also includes generating a predictive analysis of the performance of the one or more peer reviews based on the parameters.

Technical advantages of particular embodiments of the present disclosure include a method and system for generating a predictive analysis of the performance of and cost savings for peer reviews that provides tools for planning and status assessments. Users, such as project managers, may use the tools for assessing progress of peer review efforts and planning resources for projects. Thus, development time and costs may be dramatically reduced and product quality may be dramatically improved.

Another technical advantage of particular embodiments of the present disclosure includes a method and system for generating a predictive analysis of the performance of and cost savings for peer reviews that automatically adjusts based on particular project factors such as the people, environment, and processes involved in the project and demonstrated peer review performance capabilities. The adjustment is necessary because projects with more mature processes, less complex environments, and/or higher performance capabilities may require fewer peer reviews. Thus, the predictive analysis may be customized to address the particular factors associated with a particular project. In addition, since this predictive analysis includes an assessment of a project's competencies and other factors that provide it with some advantage over other projects, the outputs of this analysis can be used outside of the context of this invention.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

Figure 1A:
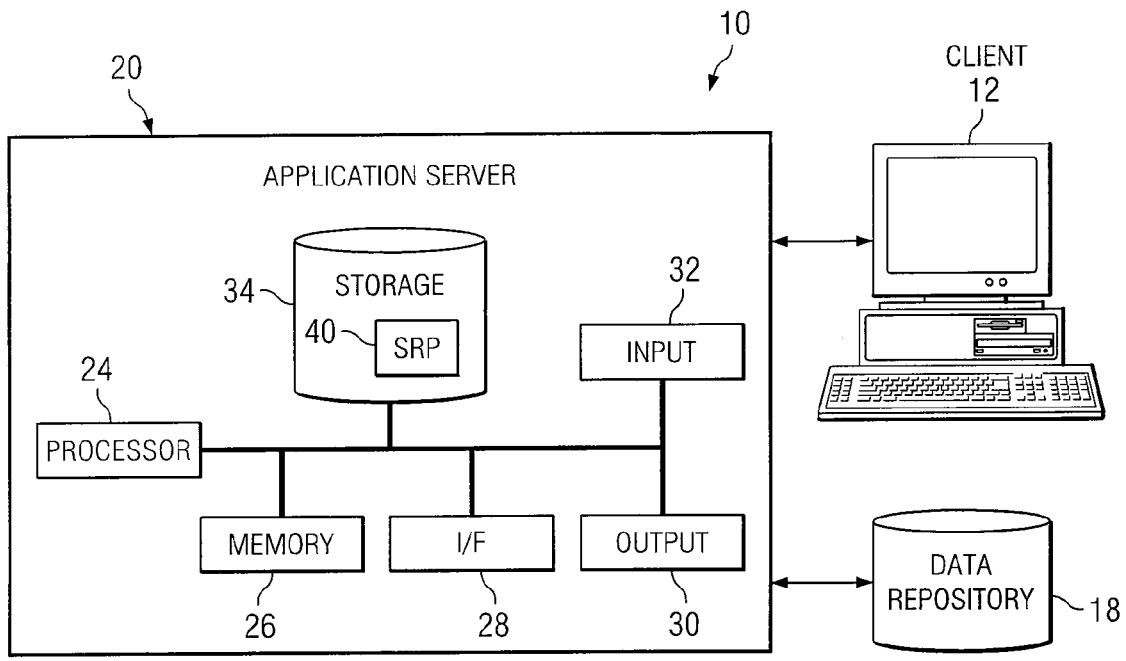
FIG. 1A is a block diagram illustrating a system for generating a predictive analysis of the performance of peer reviews according to the teachings of the disclosure.
Figure 1B:
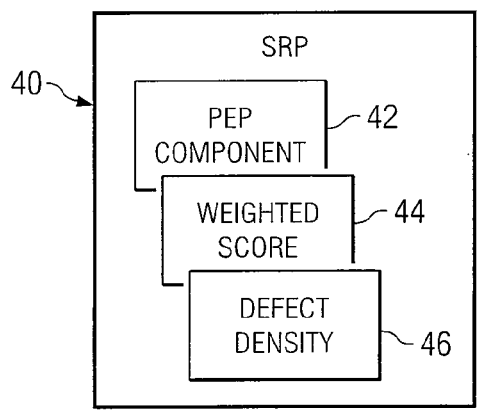
FIG. 1B is a block diagram illustrating an example software rework planner (SRP) of the system of FIG. 1A in accordance with an embodiment of the present invention.
Figure 2:
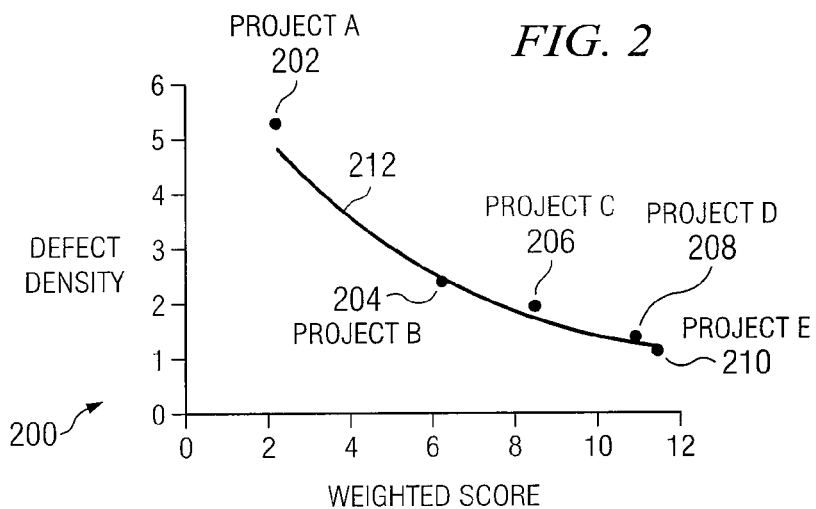
FIG. 2 is a graph illustrating an example model of the predictive analysis generated by the system of FIG. 1A.
Figure 3:
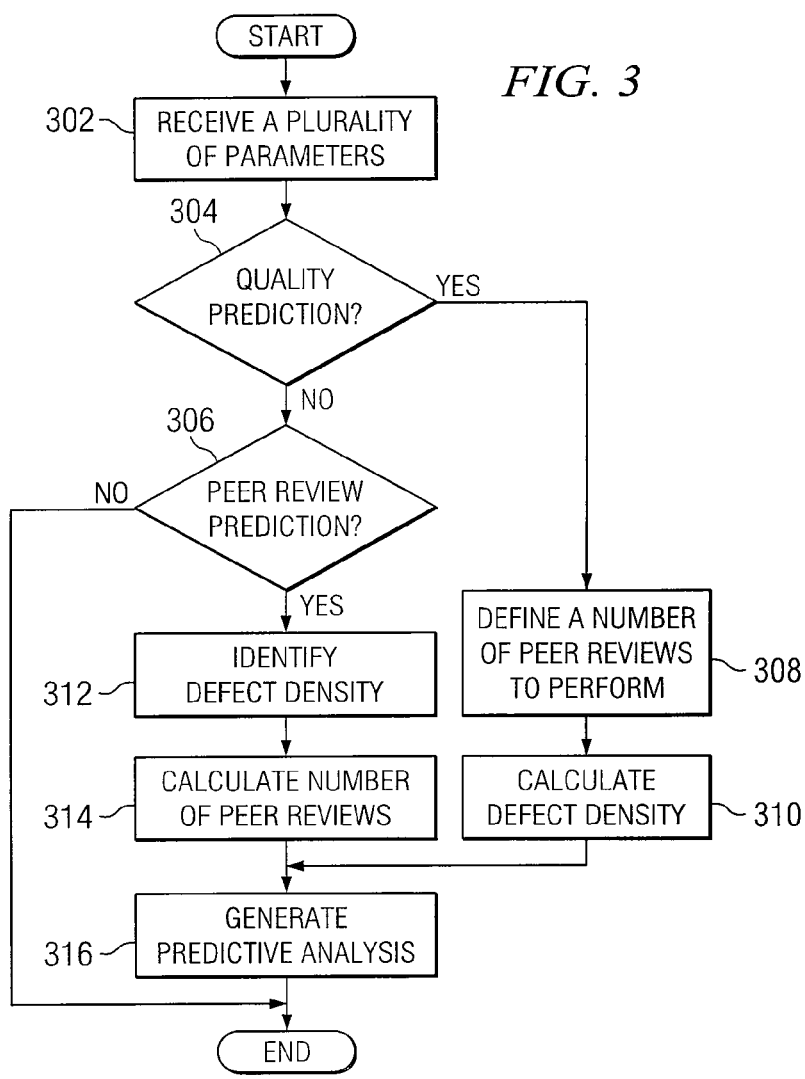
FIG. 3 is a flow chart illustrating example acts associated with a method for generating a predictive analysis of the performance of peer reviews.

Embodiments of the present disclosure and its advantages are best understood by referring to FIGS. 1 through 3 of the drawings, like numerals being used for like and corresponding parts of the various drawings.

FIG. 1A is a block diagram illustrating a system 10 for generating a predictive analysis of the performance of peer reviews according to the teachings of the disclosure. As shown in FIG. 1A, system 10 generally includes a client 12, a data repository 18, and an application server 20. System 10 is particularly adapted for generating a predictive analysis of the performance of peer reviews for a software project.

Client 12 may refer to any suitable device operable to plan peer reviews based on the predictive analysis. For example, a user of client 12, such as a project manager, may plan to perform a particular number of requirement peer reviews. Requirement peer reviews may refer to an examination of the documents describing what a particular software product should be capable of performing. As another example, client 12 may plan to perform a particular number of design peer reviews. Design peer reviews may refer to an examination of the documents describing solutions that can be transformed directly into code. As another example, client 12 may plan to perform a particular number of code peer reviews. Code peer reviews may refer to an examination of computer source code. However, the present disclosure contemplates many types of peer reviews. Various embodiments may include, some, all, or none of the enumerated peer reviews. Client 12 may execute with any of the well-known MS-DOS, PC-DOS, OS-2, MAC-OS, WINDOWS™, UNIX, or other appropriate operating systems, including future operating systems. Client 12 may include, for example, a personal digital assistant, a computer such as a laptop, a cellular telephone, a mobile handset, or any other device operable to plan peer reviews based on the predictive analysis.

Data repository 18 represents any suitable device operable to store parameters and other software project data. Although FIG. 1A provides one example of data repository 18 as operating separate from application server 20, in other embodiments data repository 18 may operate within application server 20. In yet other embodiments, client 12, data repository 18, and application server 20 may operate within the same server. Data repository 18 may be a database operable to store parameters and other software project data, and facilitate addition, modification, and retrieval of such data. In accordance with a particular embodiment of the present disclosure, data repository 18 may utilize a relational database management system to store the software project data, thereby making the data available and accessible through an easy to use, well-understood access language, such as Structured Query Language (SQL). In other embodiments, data repository 18 may utilize other data management systems.

Application server 20 may refer to any suitable device operable to provide tools for peer review planning. According to a particular embodiment of the disclosure, the tools may provide planning and status assessments for users, such as project managers, to use in planning a number of peer reviews to perform and allocating resources for peer review efforts.

In various embodiments of the disclosure, peer reviews may significantly decrease the amount of defects or errors in the final software product. Together with the qualitative benefits, major cost improvements may be achieved as the avoidance and earlier detection of errors will reduce the amount of resources needed for debugging in later phases of the project. However, the number of peer reviews to perform is often determined according to the subjective standards of either the inspectors or the members of the software development team. This approach is often problematic because different projects may require different numbers of peer reviews based on various project factors such as people and processes involved in the project, environment, and the performance capability of the personnel performing the peer reviews.

According to one embodiment of the disclosure, a system and method are provided that generate a predictive analysis of the performance of and cost savings for peer reviews. This is effected, in one embodiment, by receiving actual software project data and adjusting parameters to analyze the implications of various planning and monitoring decisions a project manager must make in order to quantitatively and pragmatically manage peer review efforts. Because project factors such as the people, processes, and environment involved are received, the analysis may be customized to address the level of competency, complexity and other factors involved in the project. As a byproduct of the predictive analysis, an assessment of a project's competencies and other factors that provide it with some advantage over other projects is generated for use outside of the context of this invention. Additional details of example embodiments of the disclosure are described in greater detail below in conjunction with portions of FIG. 1A, FIG. 2, and FIG. 3.

According to the illustrated embodiment of the disclosure, application server 20 includes a processor 24, a memory device 26, a communication interface 28, an output device 30, an input device 32, a storage device 34, and a software rework planner (SRP) 40.

SRP 40 may refer to any suitable logic embodied in computer-readable media, and when executed, that is operable to receive parameters indicative of one or more peer reviews for a software project and generate a predictive analysis of the performance of the one or more peer reviews based on the parameters. In the illustrated embodiment of the disclosure, SRP 40 resides in storage device 34. In other embodiments of the disclosure, SRP 40 may reside in memory device 26, or any other suitable device operable to store and facilitate retrieval of data and instructions. In addition, the functions performed by SRP 40 may also be performed by various other manual computation devices including, but not limited to, a calculator.

FIG. 1B is a block diagram illustrating an example SRP 40 of the system of FIG. 1A in accordance with an embodiment of the present invention. SRP 40 may include various components operable to perform various functions including a PEP component 42, a weighted score component 44, and a defect density component 46.

According to one embodiment of the disclosure, the predictive analysis generated by SRP 40 may include a quality prediction. A quality prediction may refer to an estimation of the defect density based on a number of peer reviews to be performed for the software project. A defect density may refer to the number of defects (discovered during testing) normalized by the size of the software development effort. For example, a common defect density measurement is the number of defects discovered during system integration testing per thousand equivalent source lines of code, also referred to as KESLOC. The quality prediction may include a prediction of cost savings and/or return on investment and/or cost savings as a proportion of total development cost due to defect removal with peer reviews. As a byproduct of the quality prediction, an assessment of a project's competencies and other factors that provide it with some advantage over other projects is generated for use outside of the context of this invention.

As explained in detail below, in one embodiment three equations with a fourth optional equation may be executed using input parameters related to the software project and constants that have been determined by analyzing a sample dataset of past projects. PEP component 42, weighted score component 44, and defect density component 46 may be used to execute the three equations, one equation for each component. The three equations may be executed in a particular order and the results may be combined to generate the quality prediction. The prediction of cost savings that may be included in the quality prediction is derived from the plurality of data required to generate the quality projection. However, the present disclosure contemplates many types of equations. Various embodiments may include, some, all, or none of the enumerated equations.

According to one embodiment of the disclosure, PEP component 42 may generate a numerical score which quantifies a software project's inherent advantage over other software projects in general based on process, environment, and people. The equation used by PEP component 42 may be:

$$\text{PEP\_Score} = \textit{frwk}\text{Constant} + \textit{frwk}\text{Factor} * \text{LN}(\textit{frwk}\text{LogConstant} + (\textit{frwk}\text{LogFactor} * EM)).$$

The constants used by PEP component 42 may be set according to a calibration process that adjusts the equations to a sample dataset of software projects. As more software project data is added to the dataset, the constants may be updated. The constant frwkConstant may have any suitable value, for example, $-0.0271$. The constant frwkFactor may have any suitable value, for example, $-9.41$. The constant frwkLogConstant may have any suitable value, for example, $1.16$. The constant frwkLogFactor may have any suitable value, for example, $-0.628$. The operation LN refers to the natural logarithm mathematical operation.

The variable EM may be calculated by PEP component 42 from one or more parameters. For example, the variable EM may be calculated based on a parameter indicative of one or more people working on the software project. The parameter indicative of one or more people working on the software project may include, for example, a quantitative measurement of the competency and experience of the people working as part of a software development team. The variable EM may also be calculated based on a parameter indicative of an environment of the software project. The parameter indicative of an environment of the software project may include, for example, a quantitative measurement of the security required by the users of the software and other complexities of the software project. The variable EM may also be calculated based on a parameter indicative of one or more processes associated with the software project. The parameter indicative of one or more processes associated with the software project may include, for example, a quantitative measurement of the management plan for the software project.

According to one embodiment of the disclosure, EM may refer to an effort multiplier calculated by PEP component 42 using a commercially available cost estimation technique such as the Constructive Cost Model (COCOMO, Barry Boehm, University of Southern California). For example, EM may be based on answers to questions regarding the software project. The questions may have ratings based on the parameter indicative of one or more people working on the software project, the parameter indicative of an environment of the software project, and the parameter indicative of one or more processes associated with the software project. The answers to the questions are expressed as numbers and multiplied together to generate EM.

According to one embodiment of the disclosure, EM may refer to an effort multiplier calculated by PEP component 42 using a lagging indicator. A lagging indicator may refer to a collected average number of rework hours per defect. Rework refers to the testing phases of software development where defects are resolved by the author, designer, or programmer. For example, if a defect is found in the code, the code is corrected during rework to meet the requirements in the documentation. Because lagging indicators are not collected until later phases of the project, they may be estimated for an ongoing project by directly using or adjusting the lagging indicator collected from a prior, similar project. PEP component 42 may be calculated by collecting the average number of hours required to resolve defects by the particular people working on the software project. For example, the lagging indicator may generally indicate that a particular software development team generally requires four hours to resolve a defect. As another example, the lagging indicator may indicate that a particular software team generally requires 40 hours to resolve a defect. The optional fourth equation indicated above that may be used by PEP component 42 to calculate EM using a lagging indicator may be:

$$EM = femdEM + femfEM*(EXP(femExpf*Rwrk\_Hrs\_per\_Defect) + femExpf).$$

The Rwrk_Hrs_per_Defect parameter used by PEP component 42 may refer to the rework hours per defect as described above. The constants used by PEP component 42 may be set according to a calibration process that adjusts the equations to a sample dataset of software projects. As more software project data is added to the dataset, the constants may be updated. The constant femdEM may have any suitable value, for example, 1.68. The constant femfEM may have any suitable value, for example, −1.59. The constant femExpf may have any suitable value, for example, −0.107. The operation EXP refers to the mathematical operation of raising the constant e to the power expressed in the following value in parentheses. The constant e is well known and defined as part of the natural logarithm mathematical operation and is equal to 2.718281828459 . . . (continuing infinitely).

According to one embodiment of the disclosure, PEP component 42 may generate, as a byproduct of this invention, measures that provide a numerical estimation of a software project's inherent advantage over other software projects. These measures are produced either as an EM value or as a lagging indicator (rework hours per defect). These measures may be calculated using the optional fourth equation referred to as the EM equation noted for PEP component 42, which calculates EM as a function of rework hours per defect, or a derivation of the same equation to calculate rework hours per defect as a function of EM. Both measures are significant project assessment/status measures, which are useful in a variety of project management activities.

According to one embodiment of the disclosure, weighted score component 44 may generate a weighted score for defect removal for all peer review types adjusted by the PEP_Score parameter calculated in the first equation by PEP component 42. The weighted score component predicts the magnitude of defect reduction for peer reviews and includes an adjustment for each type of peer review based on its relative effectiveness. The equation used by weighted score component 44 may be:

$$\text{Weighted Score} = fqCode*(CID + fqDesCodeRatio*(DID + RID))*EXP(fqEff/PEP\_Score).$$

The constants used by weighted score component 44 may be set according to a calibration process that adjusts the equations to a sample dataset of software projects. As more software project data is added to the dataset, the constants may be updated. The constant fqCode may have any suitable value, for example, 0.696. The constant fqDesCodeRatio may have any suitable value, for example, 3.3. The constant fqEff may have any suitable value, for example, 6.95. The operation EXP refers to the mathematical operation of raising the constant e to the power expressed in the following value in parentheses. The constant e is well known and defined as part of the natural logarithm mathematical operation and is equal to 2.718281828459 . . . (continuing infinitely).

According to one embodiment of the disclosure, defects that are found during the peer review process are generally categorized in two categories: significant and minor defects. The defects that result in incorrect behavior, missing functionality, or the likelihood of additional cost in later phases may be classified as significant defects. Significant defects may result in the software not functioning correctly or in increased software development costs if the defects are not resolved. In contrast to significant defects, minor defects do not threaten the correct functioning of the software or the cost burden in developing it, but are mostly small errors such as spelling mistakes.

The variable CID may be calculated based on the code significant defects removed normalized by the size of the software development effort. The particular number of code significant defects removed may be received by weighted score component 44 as a parameter indicative of one or more code peer reviews. The variable DID may be calculated based on the design significant defects removed normalized by the size of the software development effort. The particular number of design significant defects removed may be received by weighted score component 44 as a parameter indicative of one or more design peer reviews. The variable RID may be calculated based on the requirement significant defects removed normalized by the size of the software development effort. The particular number of requirement significant defects removed may be received by weighted score component 44 as a parameter indicative of one or more requirement peer reviews.

According to one embodiment of the disclosure, defect density component 46 may generate the defect density from the weighted score calculated by weighted score component 44. The equation used by defect density component 46 may be:

Defect Density=$fq$LN*LN(Weighted Score)+$fq$Constant.

The constants used by defect density component 46 may be set according to a calibration process that adjusts the equations to a sample dataset of software projects. As more software project data is added to the dataset, the constants may be updated. The constant fqLN may have any suitable value, for example, −2.23. The constant fqConstant may have any suitable value, for example, 6.81. The operation LN refers to the natural logarithm mathematical operation.

Thus, SRP 40 may execute three equations and a fourth optional equation to generate a defect density quality prediction using input parameters related to the software project and constants that have been determined by analyzing a sample dataset of projects. The quality prediction may indicate that a high percentage of requirement and design peer reviews will provide the greatest cost savings. A high investment of code peer reviews, however, may result in less savings than obtained with requirement or design peer reviews. For example, investing more in code peer reviews may increase quality, but from a cost basis may not result in savings over time. Thus, a project manager may use the quality prediction to experiment with setting different relative quantities of each peer review type to optimize peer review effectiveness in meeting quality and/or cost goals.

According to one embodiment of the disclosure, the predictive analysis generated by SRP 40 may also include a peer review prediction. A peer review prediction may refer to an estimation of the number of peer reviews to be performed to reach a desired defect density. For example, a desired defect density of four defects per thousand equivalent source lines of code may be specified. In the example, the peer review analysis may calculate how many peer reviews of each type (requirement, design, and code) will be needed to achieve the desired defect density. The peer review analysis may be calculated by SRP 40 using the same or derived equations and components described above but executed in a different order. For example, PEP_Score may be calculated by PEP component 42, the weighted score may be derived by defect density component 46, and then the number and type of peer reviews may be derived by weighted score component 44.

The quality prediction and peer review prediction generated by SRP 40 may indicate that as quality increases, cost for peer reviews also increases, but the net savings also increases. Thus, a project manager may use the SRP 40 to plot the relationship between savings and cost as a software project invests in peer reviews. According to various embodiments of the disclosure, the plot may indicate a relatively high savings relative to cost for small investments. However, as investment increases, savings may diminish but remain positive over time.

In addition, SRP 40 may receive parameters indicative of the demonstrated inspection performance capability of the project in conducting inspections. These performance indicators may be received at any point during the project to assess the progress and the sufficiency of the performance of inspections. For example, based on a poor assessment of the demonstrated inspection performance, the number and type of peer reviews to be performed may increase in order to reach the desired defect density. Additional details of the other components of server 20 are described below.

Processor 24 may refer to any suitable device operable to execute instructions and manipulate data to perform operations for application server 20. Processor 24 may include, for example, any type of central processing unit (CPU).

Memory device 26 may refer to any suitable device operable to store and facilitate retrieval of data. Memory device 26 may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Communication interface 28 may refer to any suitable device operable to receive input for application server 20, send output from application server 20, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows application server 20 to communicate to other devices. Communication interface 28 may include one or more ports, conversion software, or both.

Output device 30 may refer to any suitable device operable for displaying information to a user. Output device 30 may include, for example, a video display, a printer, a plotter, or other suitable output device.

Input device 32 may refer to any suitable device operable to input, select, and/or manipulate various data and information. Input device 32 may include, for example, a keyboard, mouse, graphics tablet, joystick, light pen, microphone, scanner, or other suitable input device.

Storage device 34 may refer to any suitable device operable for storing data and instructions. Storage device 34 may include, for example, a magnetic disk, flash memory, or optical disk, or other suitable data storage device.

FIG. 2 is a graph illustrating an example model 200 of the predictive analysis generated by the system of FIG. 1A. As shown in FIG. 2, model 200 generally includes a project A 202, a project B 204, a project C 206, a project D 208, a project E 210, and a model line 212. Although five projects A-E are shown, the present disclosure contemplates displaying many types of projects in model 200. Various embodiments may include some, all, or none of the enumerated projects.

According to one embodiment of the disclosure, model 200 may be generated using system 10 of FIG. 1A using the equations described above. The equations are calibrated based on actual data from previous software projects and parameters for a current software project. Model 200 displays the dynamic interaction between defect density and weighted score. In the illustrated embodiment, the defect density is the number of defects per thousand equivalent lines of code. For example, project B 204 has a defect density of 2.5 defects per thousand lines of code. In the illustrated embodiment, the weighted score is the weighted score for defect removal for all peer review types adjusted by the PEP component. A higher weighted score indicates a higher peer review performance level adjusted for a project's inherent advantage over other software projects in general based on the PEP component.

As shown in FIG. 2, as the weighted score increases the defect density decreases. For example, project B 204 with a weighted score of six has a defect density of 2.5. Project D 208 with a weighted score of 11 has a defect density of 1.5. Thus, a project manager may use the predictive analysis to optimize the allocation of resources for peer review efforts to meet quality goals as measured by defect density. According to various embodiments of the disclosure, the predictive analysis may indicate a relatively high savings relative to cost for small investments in peer reviews. As investment increases, savings may diminish but remain positive over time. Particular project factors such as demonstrated performance capability in conducting peer reviews are incorporated into the analysis because projects with higher peer review performance capability may require fewer peer reviews. Further, particular project factors such as the people and processes involved in the project are incorporated into the analysis because projects with higher competencies, training, and peer review performance capability may require fewer peer reviews. Thus, the predictive analysis may be customized to address the particular factors associated with a particular software project.

FIG. 3 is a flow chart illustrating example acts associated with a method for generating a predictive analysis of the performance of peer reviews. The example acts may be performed by SRP 40, as discussed above with reference to FIG. 1A, or by any other suitable device. At step 302, a plurality of parameters is received. The parameters may include a plurality of parameters indicative of project details, peer review results, peer review performance, software lines of codes, rework hours per defect and other data that may be useful in the prediction. The parameters may also include a parameter indicative of one or more people working on the software project. The parameter indicative of one or more people working on the software project may include, for example, a quantitative measurement of the competency and experience of the people working as part of a software development team. The parameters may also include a parameter indicative of an environment of the software project. The parameter indicative of an environment of the software project may include, for example, a quantitative measurement of the security required by the users of the software and other complexities of the software project. The parameters may also include a parameter indicative of one or more processes associated with the software project. The parameter indicative of one or more processes associated with the software project may include, for example, a quantitative measurement of the management plan for the software project.

Step 302 may, in addition, generate a numerical estimation of a software project's inherent advantage over other software projects in general based on process, environment, and people in the form of EM and/or rework hours per defect.

At step 304, it is determined whether a quality prediction is to be performed. A quality prediction may refer to an estimation of the defect density based on a number of peer reviews to be performed for the software project. If a quality prediction is to be performed, at step 308 the number and type of peer reviews to performed are defined. For example, a number of design peer reviews may be defined. Design peer reviews may refer to peer reviews directed toward design pattern documented solutions that can be transformed directly into code. As another example, a number of code peer reviews may be defined. Code peer reviews may refer to peer reviews directed toward a systematic examination of computer source code.

At step 310, a defect density is calculated based on the defined number of peer reviews and PEP_Score. PEP_Score indicates a numerical estimation of a software project's inherent advantage over other software projects in general based on process, environment, and people measurements received in the parameters described with reference to step 302.

Referring back to step 306, if a peer review prediction is to be performed, a desired defect density is defined at step 312. The desired defect density may be defined, for example, in terms of number of defects per thousand lines of code. At step 314, the number of peer reviews to be performed to reach the desired defect density is calculated. For example, a desired defect density of four defects per thousand lines of code may be defined. In the example, the peer review prediction may calculate how many peer reviews of each type (requirement, design, and code) will be needed to achieve the desired defect density.

At step 316, the results of the quality prediction or the peer review prediction are used to generate the predictive analysis. The predictive analysis may indicate a relatively high savings relative to cost for small investments in peer reviews. As investment increases, savings may diminish but remain positive over time. Particular project factors such as demonstrated performance capability in conducting peer reviews are incorporated into the analysis because projects with higher peer review performance capability may require fewer peer reviews. Further, particular project factors such as the people, environment, and processes involved in the project are incorporated into the analysis because projects with higher competencies, training, and peer review performance capability may require fewer peer reviews. Thus, the present disclosure may be customized to address the particular factors associated with a particular software project. The predictive analysis may include predictions of cost savings and/or return on investment and/or cost savings as a proportion of total development cost due to the use of peer reviews.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as falling within the spirit and scope of the appended claims.

What is claimed is:

1. A computer-implemented method for use in software development, the method comprising:
   receiving, for a software project, a plurality of parameters indicative of one or more peer reviews for the software project; and
   generating, by at least one computer system, a predictive analysis of the performance of the one or more peer reviews based on the parameters, wherein generating a predictive analysis of the performance of the one or more peer reviews based on the parameters comprises:
      identifying a desired defect density, the desired defect density indicating defects per lines of code; and
      calculating a number of peer reviews to be performed for the desired defect density.

2. The method of claim 1, wherein generating, by at least one computer system, a predictive analysis of the performance of the one or more peer reviews based on the parameters comprises:
   receiving a variable effort multiplier; and
   calculating an estimate of a lagging indicator.

3. The method of claim 1, wherein generating, by at least one computer system, a predictive analysis of the performance of the one or more peer reviews based on the parameters comprises:
   receiving a lagging indicator; and
   calculating an estimate of a variable effort multiplier.

4. The method of claim 1, wherein receiving, for a software project, a plurality of parameters further comprises receiving a parameter indicative of one or more people working on the software project, a parameter indicative of an environment of the software project, and a parameter indicative of one or more processes associated with the software project.

5. The method of claim 1, wherein receiving, for a software project, a plurality of parameters further comprises receiving at least one of the following:
- a parameter indicative of one or more requirement peer reviews to be performed;
- a parameter indicative of one or more design peer reviews to be performed; and
- a parameter indicative of one or more code peer reviews to be performed.

6. A system for use in software development, comprising:
a processor; and
a storage device embodying a program of instructions operable, when executed on the processor, to:
- receive, for a software project, a plurality of parameters indicative of one or more peer reviews for the software project;
- generate a predictive analysis of the performance of the one or more peer reviews based on the parameters;
- identify a desired defect density, the desired defect density indicating defects per lines of code; and
- calculate a number of peer reviews to be performed for the desired defect density.

7. The system of claim 6, wherein the program of instructions is further operable to:
receive a variable effort multiplier; and
calculate an estimate of a lagging indicator.

8. The system of claim 6, wherein the program of instructions is further operable to:
receive a lagging indicator; and
calculate an estimate of a variable effort multiplier.

9. The system of claim 6, wherein the program of instructions is further operable to receive a parameter indicative of one or more people working on the software project, a parameter indicative of an environment of the software project, and a parameter indicative of one or more processes associated with the software project.

10. The system of claim 6, wherein the program of instructions is further operable to receive at least one of the following:
- a parameter indicative of one or more requirement peer reviews to be performed;
- a parameter indicative of one or more design peer reviews to be performed; and
- a parameter indicative of one or more code peer reviews to be performed.

11. A computer readable media having executable instruction stored thereon, the executable instruction being operable, when executed on a processor, to:
- receive, for a software project, a plurality of parameters indicative of one or more peer reviews for the software project;
- generate a predictive analysis of the performance of the one or more peer reviews based on the parameters;
- identify a desired defect density, the desired defect density indicating defects per lines of code; and
- calculate a number of peer reviews to be performed for the desired defect density.

12. The computer readable media of claim 11, wherein the executable instruction is further operable to:
receive a lagging indicator; and
calculate an estimate of a variable effort multiplier.

13. The computer readable media of claim 11, wherein the executable instruction is further operable to:
identify a desired cost savings; and
calculate a number of peer reviews to be performed for the desired cost savings.

14. The computer readable media of claim 11, wherein the executable instruction is further operable to: receive a parameter indicative of one or more people working on the software project, a parameter indicative of an environment of the software project, and a parameter indicative of one or more processes associated with the software project.

15. The computer readable media of claim 11, wherein the executable instruction is further operable to receive at least one of the following:
- a parameter indicative of one or more requirement peer reviews to be performed;
- a parameter indicative of one or more design peer reviews to be performed; and
- a parameter indicative of one or more code peer reviews to be performed.

* * * * *